Nov. 19, 1929.　　　M. C. STEESE　　　1,736,675
METHOD OF AND MEANS FOR BURNING FUEL IN REGENERATIVE FURNACES
Filed Nov. 29, 1920　　　2 Sheets-Sheet 1
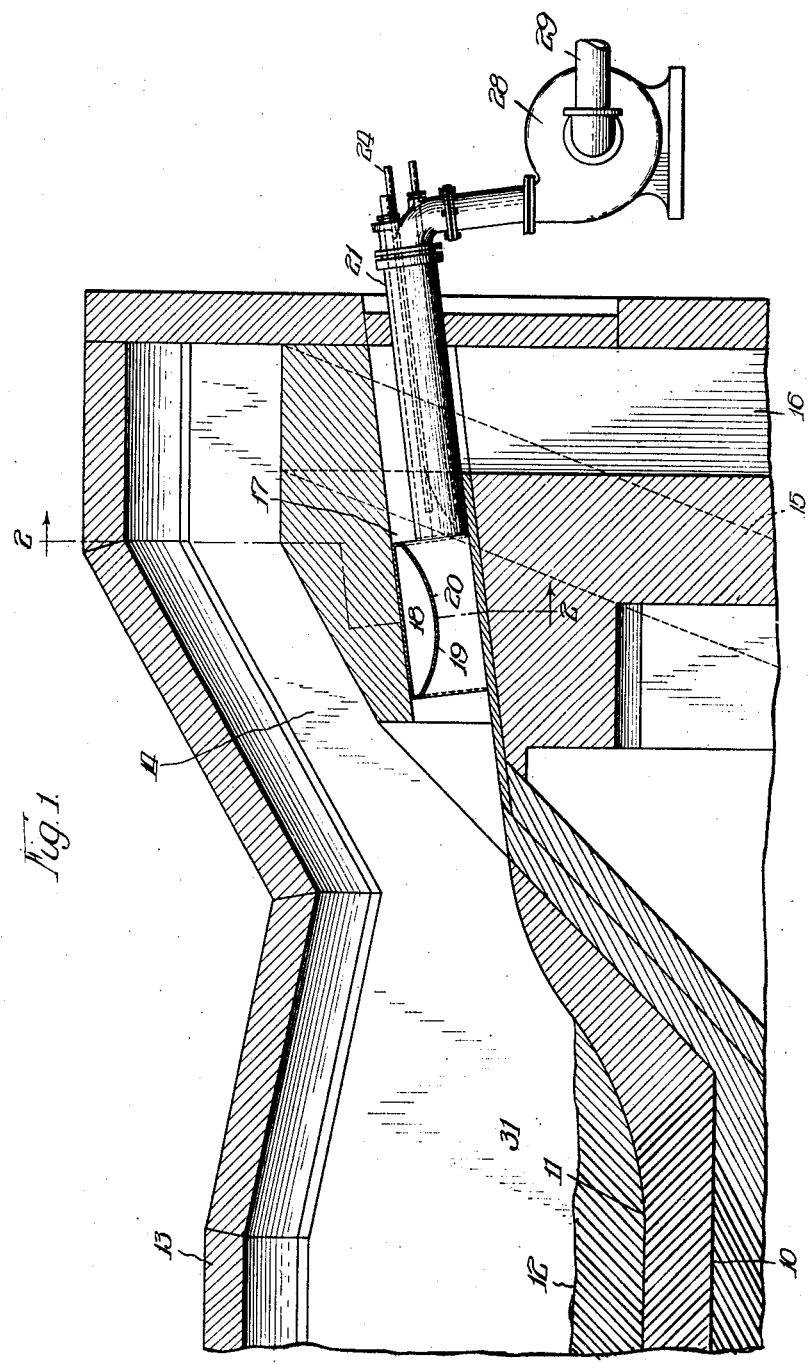

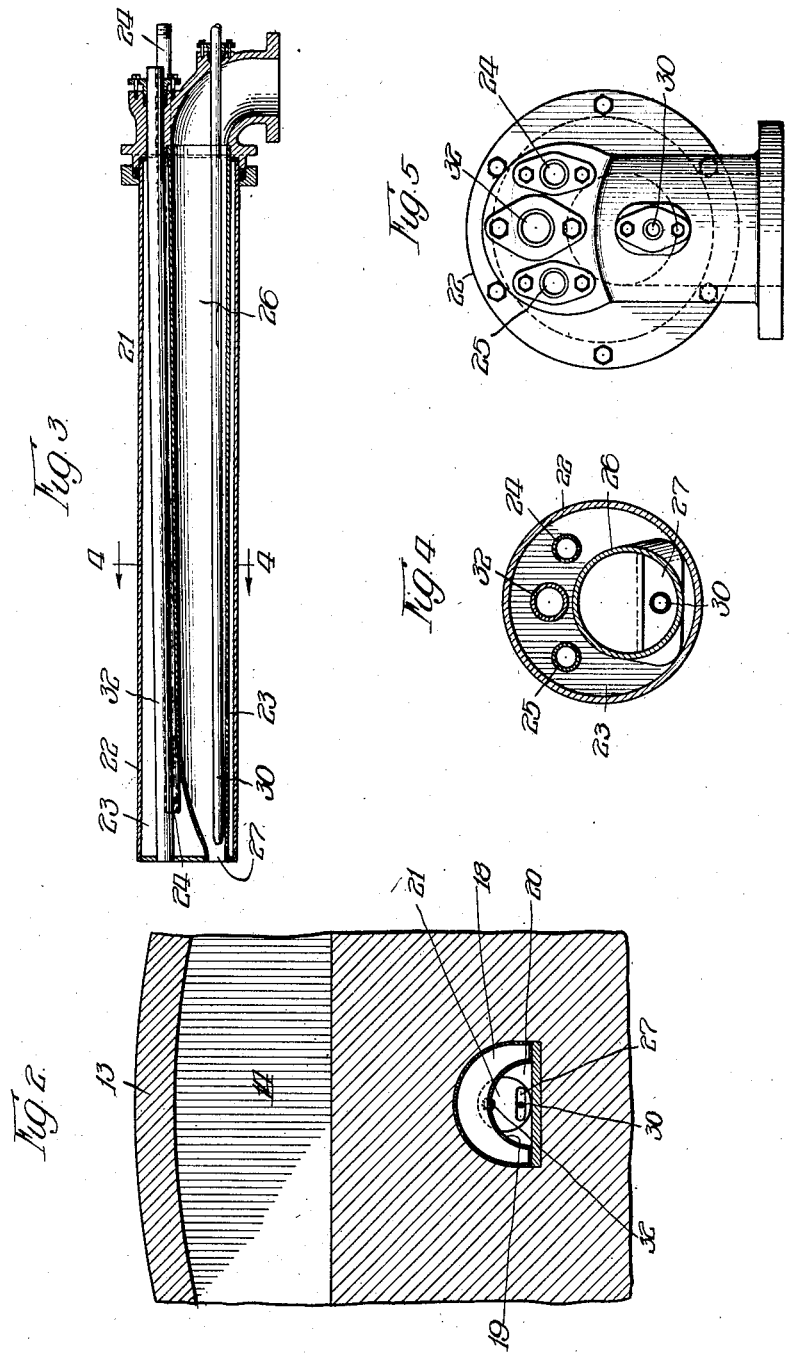

Patented Nov. 19, 1929

1,736,675

UNITED STATES PATENT OFFICE

MARCUS C. STEESE, OF HAMBURG, NEW YORK

METHOD OF AND MEANS FOR BURNING FUEL IN REGENERATIVE FURNACES

Application filed November 29, 1920. Serial No. 427,002.

This invention relates to a method of and means for burning fuel in regenerative furnaces.

In cases where coke oven gas, natural gas, producer gas and powdered fuels are used, if an intimate mixture of either of such fuels and air is not procured at the point of entry into the combustion chamber, the fuel and air will pass into the combustion chamber, in a stratified manner whereby combustion takes place slowly and is not complete before the fuel is removed from the combustion chamber. In other words, the thermal efficiency of the unit is relatively low. Coke oven gas, for example, being high in hydrogen, complete combustion of such gas does not take place in the combustion chamber of open hearth furnaces built heretofore, possibly with one exception, due to the disassociation of hydrogen after partial combustion has taken place. Unless the hydrogen is burned rapidly, due to its lightness, it also rises to the roof, where secondary combustion takes place and burns the brickwork. Unless precaution is used, this secondary combustion will extend down the uptakes and burn out the brickwork in them and even in the checkers. In connection with the one possible exception referred to, coke oven gas and other gases have been burned efficiently in open hearth furnaces by blowing air into a port into which gas has been admitted. However, such gas has had no induction action upon the air.

However, in the arrangement which I have provided, at the port of the combustion chamber I cause a very intimate association between the fuel and the air, the latter being induced by the flow of the former, whereby a partial combustion of the mixture takes place within the port, and when the mixture of fuel and air passes from this port or out of this orifice into the combustion chamber and its velocity is retarded below the propagation velocity of the flame, combustion of the mixture takes place very rapidly and completely, preventing the escape of any hydrogen and its retarded combustion which results in destruction of brickwork and a loss in thermal efficiency. Of course, it is understood that there is an upward flow of air through the uptakes due to thermal head or temperature in the uptakes. But such is not sufficient to supply the amount of air within the gas mixing chamber or gas port for creating as rapidly a combustible mixture as is necessary for efficient operation of the furnace. To get the necessary increased supply of air, I supply the fuel or gas under a relatively high pressure through a nozzled orifice confined within a port which is sufficiently small to insure the induction action of the fuel upon the air to be induced. Some of the advantages of this method over any known method in regenerative furnaces is a less expensive furnace construction, less complicated mechanism and attachments, the elimination to a greater extent of the attention required by the operator and the automatic regulation of the supply of induced air in proportion to the amount of fuel supplied, the induced air being drawn through what in present regenerative furnaces is called the gas uptakes or ports, or both.

In a regenerative furnace it is advisable to direct this flame issuing from the gas port to the point where it will do the most work. This direction is procured by the overhead or so-called air port through which sufficient auxiliary air to insure complete combustion is admitted under control of the operator. This air directs the faster burning mixture of gas and air from the port or orifice down upon the bath and holds it in its proper direction throughout the furnace and also aids in the complete combustion.

One object of my invention is to make possible the complete combustion of coke oven gas, natural gas, producer gas and other fuels in a regenerative furnace.

Another object is to supply fuel to a regenerative furnace in a novel manner whereby the same properly mixes with the air and is completely consumed for increasing the thermal efficiency of the furnace.

Another object is to control the supply of fuel, air, the combustible mixture, and the flow of the burning fuel in a manner to meet all of the requirements of practical furnace operation.

These and other objects are accomplished by means of the arrangement disclosed on the accompanying sheets of drawings, in which—

Figure 1 is a sectional view of a regenerative furnace equipped with my invention;

Figure 2 is a sectional view taken in the plane of line 2—2 of Figure 1;

Figure 3 is a detail longitudinal sectional view of my gas burner through which gas or other fuel is supplied to the port of the furnace and by means of which primary air is induced or drawn into and through the port and mixed with the gas preparatory to passing into the combustion chamber;

Figure 4 is a sectional view taken in the line 4—4 of Figure 3; and,

Figure 5 is an end view of the arrangement shown in Figure 3.

The various novel features of my invention will be apparent from the following description and drawings and will be particularly pointed out in the appended claims.

My invention consists in utilizing the energy of the fuel flow in a properly located orifice in the present so-called gas port of a regenerative furnace for inducing air through the gas port, mixing the air so induced with the gas, establishing a preliminary partial combustion in the gas port, and controlling the complete combustion of the gas and the direction of this flame by the introduction of further air through the air port of a regenerative furnace.

Referring to the figures of the drawings, it will be noted that there is shown a regenerative furnace having the usual bottom 10, hearth 11 on which the bath 12 is supported, and a roof 13. An air port 14 is shown and directed in a proper direction, which in this case is shown as downward and inward, whereby air supplied through one or more air uptakes 15 connected to the air port 14 is directed upon the bath 12. This regenerative furnace is provided with an uptake 16 which, in ordinary regenerative furnace practice, is a gas uptake, but in the application of my invention to a regenerative furnace such uptake 16 is for the supply of air. The uptake 16 communicates with an inlet passageway 17 in which I prefer to place a narrow reducing member 18 preferably having a streamline curve 19, such as used in the Venturi tube for increasing the velocity of a fluid medium passing therethrough. This member 18 is not essential to the proper operation of the device, but it increases the efficiency thereof. Preferably, when used, this member 18 is presented forwardly in the inlet 17 and forms in effect a port 20.

Extending into the inlet 17 and terminating at or in the port 20 is placed my burner 21. Among other things, this burner includes a closed casing 22 having a water jacket 23 for the circulation of cooling water which may be supplied through a water inlet pipe 24 and withdrawn through a water outlet pipe 25. Extending through this casing is a fuel supply pipe 26 which terminates in a nozzle 27 at the active end of the burner. Fuel may be supplied through the inlet 26 and nozzle 27 by a pump 28 (if it is necessary to boost the pressure) connected to a fuel source indicated by pipe 29, or fuel may be supplied through its own natural pressure where there is a pressure from one to ten pounds. In the latter case it may be desirable to use an auxiliary jet 30 within the fuel conduit 26 through which air or steam or other fluid may be forced to flow for augmenting the flow of fuel and increasing its inducing action. In any event, the flow of fuel through the nozzle 27 into the port 20 induces a primary supply of air which is drawn through uptake 16 and into the port 20 wherein the fuel and air are mixed whereby a partial combustion takes place. The velocity of this mixture is relatively high in the port 20 and when this flaming mixture passes from the port into the combustion chamber 31, its velocity is retarded below that of the propagation velocity of the flame whereby the combustion of the mixture takes place very rapidly and completely. The complete combustion of the gas is assisted by the flow of auxiliary air through the air port 14, which is located over the gas port 20. As mentioned above, the inclination of the auxiliary air intake 14 is such that the flaming mixture is directed by the flow of auxiliary air from the port or orifice 20 down upon the bath 12 within and holds it in its proper direction throughout the furnace and at the same time aids in effecting complete combustion of the mixture. The end of the nozzle 27 is so located in the gas port that the flow of gas issuing from the nozzle gives up its energy, inducing air to flow through the uptake 16 and intake 17, most of the air being above the fuel flow, and the mixture of fuel and air issuing from the port 20 in the proper stage of partial combustion and with a velocity which is fairly uniform throughout the section of the nose of the port.

As is understood, air is drawn to a certain extent into the combustion chamber of a regenerative furnace because of the heat therein, but by supplying fuel under pressure in the manner which has been described, air is induced to flow into the associated passageway and thoroughly mix with the fuel in the port to form a partial combustible mixture, the combustibility of which mixture is increased by sufficient auxiliary air supply, which is directed in a manner to force the flame upon the bath and to hold the proper direction of the flame throughout the combustion chamber.

This invention finds particular application in connection with such gaseous fuels as coke oven gas and natural gas. However, it will be understood that my invention is applicable also to the use of other gases and, in fact, combustible fluids other than gas; for example, if desired, atomized tar under pressure may be supplied through the tube 32, which preferably is included as a part of my burner, it being understood that the tar is supplied under a pressure sufficient for inducing the primary supply of air through the port 20.

In the appended claims the expressions: "close to one side of the confined space" and "close to one side of the inlet passageway" are to be understood as locating the central axis of the fuel flow and/or the central axis of the fuel outlet at a sufficient distance from the central axis of the inlet passageway 17 to cause a greater induction in one part of the cross-sectional area of the inlet passageway than in other parts thereof, and, at the same time, direct the flow of the fuel elements and the flame into the combustion chamber and maintain such fuel elements and flame substantially in contact with the surface to be heated.

The position of the burner, or the nozzle thereof within its associated port, may vary in different equipments, and there may be various modifications of the application of the invention. It is my intention to cover all such modifications which do not involve a departure from the spirit and scope of my invention as set forth in the following claims.

I claim:

1. The method of supplying and burning fuel in regenerative furnaces, consisting in conducting fuel under pressure into a confined space, then reducing the fuel outlet, thereby transforming some of its pressure into greater velocity, and then directing the flow of fuel close to one side of such confined space whereby the induction of air along the fuel jet is restricted where such jet is in close proximity to one side of such space, and the induction caused by the jet is effective on the air in all other parts of such confined space.

2. The method of supplying and burning fuel in regenerative furnaces, consisting in conducting fuel under pressure into a confined space, then reducing the fuel outlet, thereby transforming some of its pressure into greater velocity, then locating the fuel outlet within the confined space, and then directing the flow of fuel close to one side of such confined space whereby the induction of air along the fuel jet is restricted where such jet is in close proximity to one side of such space, and the induction caused by the jet is effective on the air in all other parts of such confined space.

3. The method of supplying and burning fuel in regenerative furnaces, consisting in conducting fuel under pressure into a confined space, then reducing the fuel outlet, thereby transforming some of its pressure into greater velocity, then directing the flow of fuel close to one side of such confined space whereby the induction of air along the fuel jet is restricted where such jet is in close proximity to one side of such space, and the induction caused by the jet is effective on the air in all other parts of such confined space, and then directing the flow of the fuel elements into the furnace combustion chamber and maintaining such fuel elements and flame substantially in contact with the surface to be heated, thereby substantially preventing the air induced by the fuel jet from coming in contact with the surface to be heated.

4. The method of supplying and burning fuel in regenerative furnaces, consisting in conducting fuel under pressure into a confined space, then reducing the fuel outlet, thereby transforming some of its pressure into greater velocity, then directing the flow of fuel close to one side of such confined space whereby the induction of air along the fuel jet is restricted where such jet is in close proximity to one side of such space, and the induction caused by the jet is effective on the air in all other parts of such confined space, then directing the flow of the fuel elements into the furnace combustion chamber and maintaining such fuel elements and flame substantially in contact with the surface to be heated, thereby substantially preventing the air induced by the fuel jet from coming in contact with the surface to be heated, and then supplying under pressure above the main fuel jet supplementary fuel of a higher gaseous specific gravity than the main fuel, thereby forcing the main fuel elements into closer contact with the surface to be heated and increasing the induction.

5. The method of supplying and burning fuel in regenerative furnaces, consisting in conducting fuel under pressure into a confined space, then reducing the fuel outlet, thereby transforming some of its pressure into greater velocity, then directing the flow of fuel close to one side of such confined space whereby the induction of air along the fuel jet is restricted where such jet is in close proximity to one side of such space, and the induction caused by the jet is effective on the air in all other parts of such confined space, then directing the flow of the fuel elements into the furnace combustion chamber and maintaining such fuel elements and flame substantially in contact with the surface to be heated, thereby substantially preventing the air induced by the fuel jet from coming in contact with the surface to be heated, then supplying under pressure above the main fuel jet supplementary fuel of a higher gaseous specific gravity than the main fuel, thereby forcing the main fuel elements into closer contact with the surface to be heated, and increasing the induction, and then supplying auxiliary air above the fuel jet and directing such air so that it will force the fuel elements and flame upon the surface to be heated.

6. In a regenerative furnace, the combination with an uptake and an inlet passageway communicating with the uptake and with the combustion chamber of the furnace, of a fuel supply pipe for directing a fuel jet under pressure into the inlet passageway, the cross-sectional area of such fuel pipe being greatly restricted at its outlet whereby the velocity of the fuel jet is greatly increased, such fuel outlet being located close to one side of the inlet passageway, thereby creating induction upon all sides of the formed fuel jet except where induction is minimized because of the close proximity of the fuel outlet and fuel jet to one side of the passageway, whereby the fuel elements and flame are maintained substantially in contact with the surface to be heated.

7. In a regenerative furnace, the combination with an uptake and an inlet passageway communicating with the uptake and with the combustion chamber of the furnace, of a fuel supply pipe for directing a fuel jet under pressure into the inlet passageway, the cross-sectional area of such fuel pipe being greatly restricted at its outlet whereby the velocity of the fuel jet is greatly increased, such fuel outlet being located within the inlet passageway and close to one side of the inlet passageway, thereby creating induction upon all sides of the formed fuel jet except where induction is minimized because of the close proximity of the fuel outlet and fuel jet to one side of the passageway, whereby the fuel elements and flame are maintained substantially in contact with the surface to be heated.

8. In a regenerative furnace, the combination with an uptake and an inlet passageway communicating with the uptake and with the combustion chamber of the furnace, of a fuel supply pipe terminating in a nozzle and directing a fuel jet under pressure into the inlet passageway, such nozzle being located close to one side of the inlet passageway, thereby creating induction upon all sides of the formed fuel jet except where induction is minimized because of the close proximity of the nozzle and fuel jet to one side of the passageway so that the fuel elements and flame are maintained substantially in contact with the surface to be heated, and means for supplying under pressure supplementary fuel above the main fuel jet and within the inlet passageway, such supplementary fuel having a higher gaseous specific gravity than the main fuel whereby the combustible mixture and flame are maintained in closer contact with the surface to be heated, and induction is thereby increased.

9. In a regenerative furnace, the combination with an uptake and an inlet passageway communicating with the uptake and with the combustion chamber of the furnace, of a fuel supply pipe for directing a fuel jet under pressure into the inlet passageway, the cross-sectional area of such fuel pipe being greatly restricted at its outlet whereby the velocity of the fuel jet is greatly increased, such fuel outlet being located close to one side of the inlet passageway, thereby creating induction upon all sides of the formed fuel jet except where induction is minimized because of the close proximity of the fuel outlet and fuel jet to one side of the passageway, and an air port for conducting auxiliary air above the inlet passageway and directing such air so that it will force the flaming mixture coming from the inlet passageway down upon the surface to be heated.

10. In a regenerative furnace, the combination with an uptake and an inlet passageway communicating with the uptake and with the combustion chamber of the furnace, of a fuel supply pipe terminating in a nozzle and directing a fuel jet under pressure into the inlet passageway, such nozzle being located close to one side of the inlet passageway, thereby creating induction upon all sides of the formed fuel jet except where induction is minimized because of the close proximity of the nozzle and fuel jet to one side of the passageway so that the fuel elements and flame are maintained substantially in contact with the surface to be heated, means for supplying under pressure supplementary fuel above the main fuel jet and within the inlet passageway, such supplementary fuel having a higher gaseous specific gravity than the main fuel whereby the induction is increased and the combustible mixture and flame are maintained in closer contact with the surface to be heated, and an air port for conducting auxiliary air above the inlet passageway and directing such air so that it will force the flaming mixture coming from the inlet passageway upon the surface to be heated.

11. In a regenerative furnace the combination of a gas flue, an air flue, a mixing chamber near each end of said furnace having a restricted portion intermediate its ends and a comparatively small nozzle co-operating with said mixing chamber near the restricted portion, whereby air from said flue is drawn into the mixing chamber and properly mixed with gas to produce efficient combustion.

12. In a regenerative furnace, the combination of a gas flue, an air flue, a mixing chamber having a restricted portion between its inlet and outlet ends and a comparatively small nozzle co-operating with said mixing chamber.

13. In a regenerative furnace the combination of an air flue, a gas flue, a mixing chamber provided with a restricted portion, a nozzle having its discharge within said chamber adjacent the constricted portion and for the purpose set forth.

14. In a regenerative furnace a mixing chamber restricted between its ends, a nozzle co-operating therewith, a gas flue, and fluid cooled means directly cooperating with said flue and nozzle.

Signed at Chicago, Illinois, this 22nd day of November, 1920.

MARCUS C. STEESE.